United States Patent
VanBlon et al.

(10) Patent No.: US 10,678,320 B2
(45) Date of Patent: ***Jun. 9, 2020

(54) DEVICE POWER MONITORING AND OPTIMIZATION

(71) Applicant: Lenovo (Singapore) Pte. Ltd., Singapore (SG)

(72) Inventors: Russell Speight VanBlon, Raleigh, NC (US); Ratan Ray, Cary, NC (US); Jonathan Gaither Knox, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 63 days.

This patent is subject to a terminal disclaimer.

(21) Appl. No.: 14/811,282

(22) Filed: Jul. 28, 2015

(65) Prior Publication Data

US 2017/0031424 A1    Feb. 2, 2017

(51) Int. Cl.
  *G06F 1/3234* (2019.01)
  *G06F 1/3203* (2019.01)
  *G06F 1/3206* (2019.01)
  *G06F 1/28* (2006.01)

(52) U.S. Cl.
  CPC .............. *G06F 1/3234* (2013.01); *G06F 1/28* (2013.01); *G06F 1/3203* (2013.01); *G06F 1/3206* (2013.01)

(58) Field of Classification Search
  None
  See application file for complete search history.

(56) References Cited

U.S. PATENT DOCUMENTS

| | | | |
|---|---|---|---|
| 8,805,764 B1* | 8/2014 | Rhines | G06F 1/3209 706/46 |
| 2006/0217152 A1* | 9/2006 | Fok | H01M 10/48 455/557 |
| 2011/0301890 A1* | 12/2011 | Shirriff | G01R 31/371 702/63 |
| 2015/0082097 A1* | 3/2015 | Brewer | G06F 11/3409 714/47.1 |
| 2015/0286820 A1* | 10/2015 | Sridhara | G06F 21/566 713/320 |
| 2016/0061904 A1* | 3/2016 | Flugge | H04W 52/0261 702/63 |
| 2017/0031797 A1* | 2/2017 | VanBlon | G06F 11/3409 |

FOREIGN PATENT DOCUMENTS

| | | |
|---|---|---|
| CN | 1878364 A | 12/2006 |
| CN | 102156530 A | 8/2011 |
| CN | 103135739 A | 6/2013 |
| CN | 104461846 A | 3/2015 |
| CN | 104702833 A | 6/2015 |

* cited by examiner

*Primary Examiner* — Kim Huynh
*Assistant Examiner* — Joshua Neveln
(74) *Attorney, Agent, or Firm* — Ference & Associates LLC

(57) ABSTRACT

One embodiment provides a method, including: obtaining, using a processor, a system power consumption metric; determining, using a processor, a change in the system power consumption metric over time; obtaining, using a processor, system change data; associating, using a processor, the change in the system power consumption metric and the system change data; and indicating, using an output device, a system change associated with the change in the system power consumption metric. Other aspects are described and claimed.

16 Claims, 3 Drawing Sheets

DEVICE POWER MONITORING AND OPTIMIZATION

BACKGROUND

Devices such as desktops, laptops, tablet computing devices, mobile phones or smart phones, e-readers, and the like provide users with convenient functionality. Users are increasingly interested in devices that are efficient in terms of power consumption. This interest may stem from a variety of concerns, e.g., conserving battery power in a mobile device, conserving electricity consumption in devices generally, etc.

Many users find that the devices they use, when new or different software applications are installed or turned on, when new or different hardware devices are connected or running, etc., consume the device's power differently. Often, the user will notice that the battery seems to be discharging at a higher rate or that the device is heating up, using more electric power (and thus costing more to run), etc. Although the user may notice these effects, their root case is often illusory.

BRIEF SUMMARY

In summary, one aspect provides a method, comprising: obtaining, using a processor, a system power consumption metric; determining, using a processor, a change in the system power consumption metric over time; obtaining, using a processor, system change data; associating, using a processor, the change in the system power consumption metric and the system change data; and indicating, using an output device, a system change associated with the change in the system power consumption metric.

Another aspect provides a device, comprising: a processor; a memory device that stores instructions executable by the processor to: obtain a system power consumption metric; determine a change in the system power consumption metric over time; obtain system change data; associate the change in the system power consumption metric and the system change data; and indicate a system change associated with the change in the system power consumption metric.

A further aspect provides a product, comprising: a storage device having code stored therewith, the code being executable by a processor and comprising: code that obtains a system power consumption metric; code that determines a change in the system power consumption metric over time; code that obtains system change data; code that associates the change in the system power consumption metric and the system change data; and code that indicates a system change associated with the change in the system power consumption metric.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
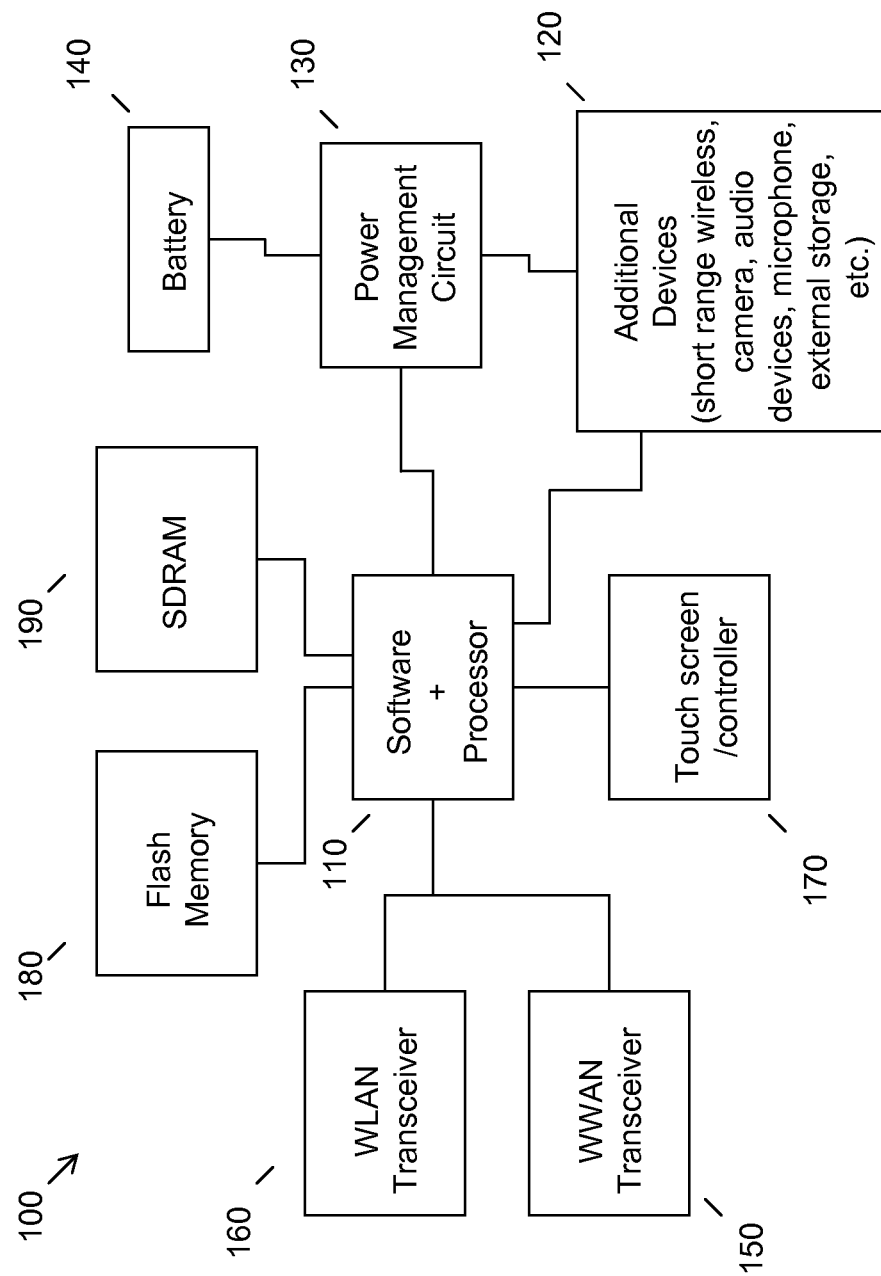
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Over time, devices experience changes in power consumption, e.g., a device's battery seems to drain more quickly, a device running on wall/commercial power may consume more electricity, etc. There can be many causes of a change in device power consumption. For example, a change in power consumption may be due to a growing number of applications being installed and running on the device, hardware performance issues (e.g., added hardware that consumes power, conflicts with stock device hardware or software, etc.). Currently, the user may attempt to manage the system's power consumption manually, e.g., force-stop applications, etc., or via a software tool that implements certain power profiles. However, users often do not have the expertise to do this management properly. In addition, the power profiles are not targeted to a specific machine the user is operating, and even if so, such tools are directed to a static template of power settings.

Accordingly, an embodiment gathers or monitors data regarding system power consumption and system changes. An embodiment determines when certain operations occur and correlates the power usage associated with those operations with changes in the system. A system may be a device itself or a sub-system of a device. System power consumption measurements may include data such as Disk I/O activity, operating system (OS) or device startup, the opening an application, an application running in the background, hardware's or an accessory's power usage, etc. User actions such as adding hardware, installing or modifying applications, copying or moving files, installing OS or application updates, modifying OS settings, etc., may also be monitored, e.g., recorded along with a timestamp, so that these operations may be correlated against power usage statistics.

When each operation occurs, an embodiment may compare the operation's power usage with previous measurements. When an operation's power usage goes up (that is, more power is required for the same task or operation), an embodiment may bring this to the user's attention.

Power usage also may be impacted by a single application running, multiple applications running in a particular combination or sequence, an application or hardware operating in combination or sequence, or multiple hardware operations interacting. If these interactions, or patterns thereof, are monitored, these may be interpreted such that power performance impacts of such patterns may be noted and used to improve power consumption. For example, using recorded historical data, such operations or patterns thereof may be presented to the user so that the user is aware of the power consumption impact of performing the operation or operations. For example, an embodiment may monitor and determine that if Device A is used at the same time as Device B, the combination of these devices operating at the same time has a synergistic and negative impact on system power consumption. In contrast, each device individually may be operated at less power than the combination of devices. An embodiment may notify a user of this fact, e.g., prior to or during combined operation of the devices, such that the user may operate the devices separately if power savings is desirable.

An embodiment may provide recommendations to the user for managing power consumption given the availability of data regarding changes in power consumption and power usage statistics for particular applications and components. For example, an embodiment may notify a user that a certain attached hardware is increasing power usage. An embodiment may query whether the user wishes to continue using that particular hardware given its impact on power consumption. An embodiment likewise may notify a user that a piece of software has increased power usage since it was installed. As another example, an embodiment may notify a user when an OS or software setting has changed and resulted in increased power usage. An embodiment also may notify a user that running an application in the background consumes a certain amount of power, such that a recommendation is made that the application be turned off rather than installed. An embodiment may notify a user that when the user copies a large number of files to a drive, which causes an application to read/parse the files, a certain amount of power is utilized.

The notification may include, for example, a recommendation, e.g., to disable or uninstall the application, to move files elsewhere, or remove the files. An embodiment may additional provide the recommendation in advance of the operation. For example, prior to installing an application, an embodiment may notify the user of the application's typical power consumption, e.g., based on knowledge gathered from other devices.

Many different types of analyses may be conducted with respect to noting a power consumption change and making a recommendation. For example, an embodiment may compare disk power usage over a short or long period of time and compare it to what the disk firmware reports should be typical power usage for that specific disk. This may permit a recommendation regarding the continued use of the disk, e.g., that the disk should be scanned or analyzed further in an effort to identify why the disk's power consumption has changed.

Additionally, an embodiment may notify a user when power consumption changes in a positive way. For example, a user may be notified that when they set a particular application setting to a new setting, and this new setting saves a certain amount of power. This makes the user aware that the user has made a positive change to the system in terms of power consumption.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included. System 100 often includes a touch screen 170 for data input and display/rendering. System 100 also typically includes various memory devices, for example flash memory 180 and SDRAM 190.

Figure 2:
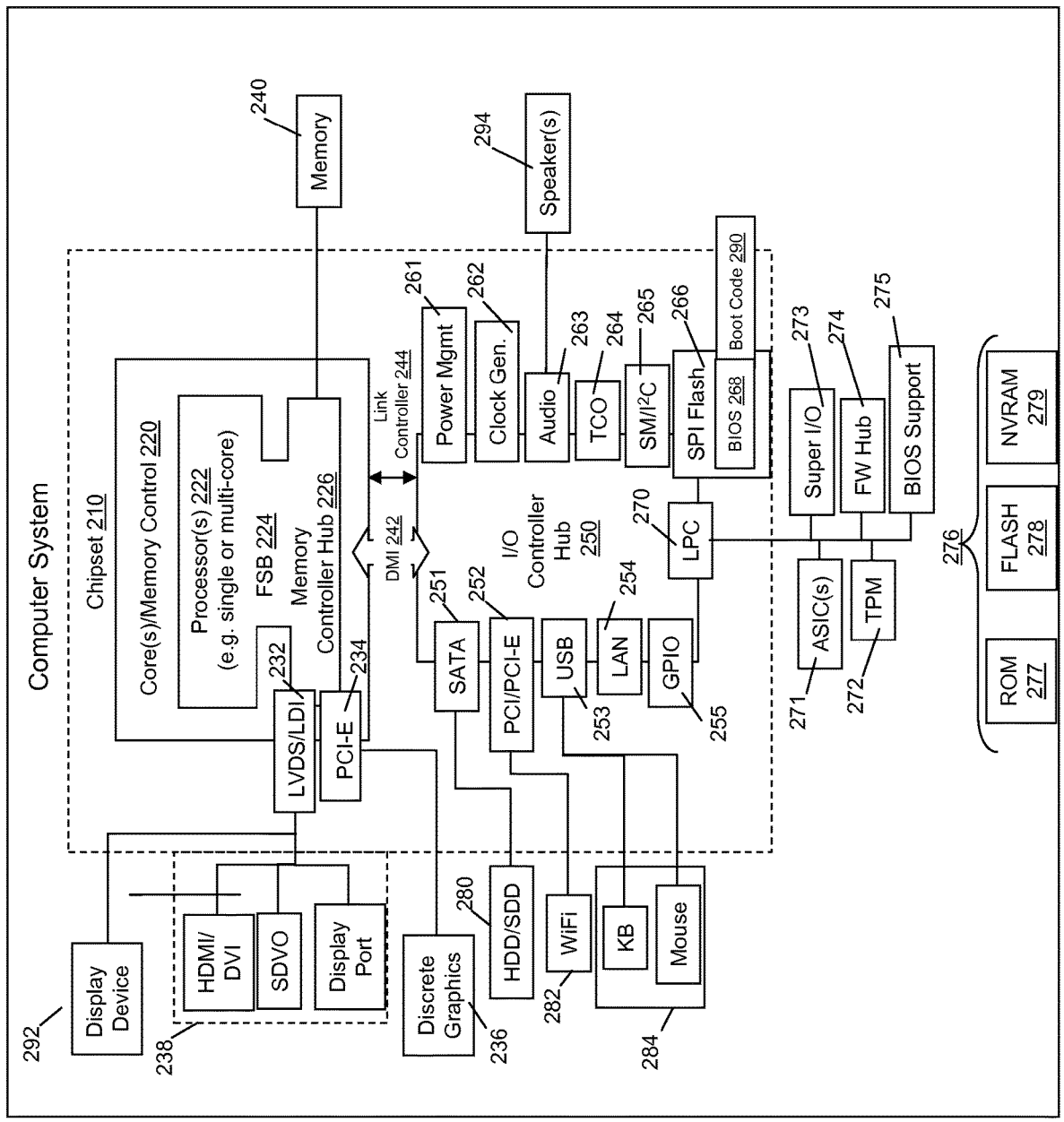
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as laptops, desktops, tablets, smart phones, personal computer devices generally, and/or electronic devices that may experience a change in the system and thus a change in power consumption of the system. Accordingly, an embodiment implements a device monitor that tracks system power usage metrics, as described herein, as well as changes which the system has undergone. By virtue of such monitoring program, an embodiment has access to data, e.g., system power usage data and system change data, with which changes in power usage may be associated with specific system changes. As such, an embodiment is capable of notifying the user regarding the likely cause of the power usage change and may additionally suggest or automatically implement changes to remedy the same.

Figure 3:
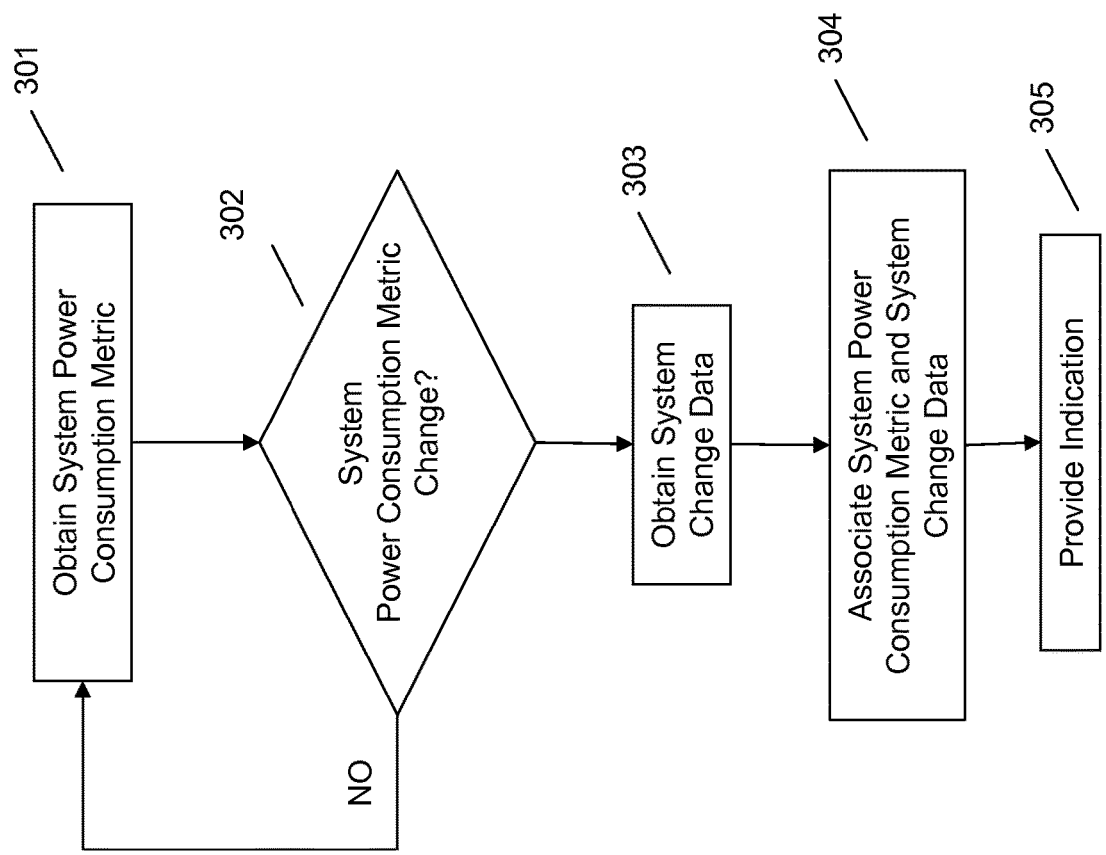
FIG. 3 illustrates an example method of monitoring and optimizing system power consumption.

Turning to FIG. 3, an example method of system power monitoring and optimization is illustrated. As illustrated in FIG. 3, an embodiment obtains, from a monitoring program (e.g., implemented as a stand alone application, integrated with an operating system or device software program, implemented on a system I/O chip or hub controller 250 of FIG. 2, or as a remote or distributed application) a system power consumption metric at 301. By way of non-limiting example, a monitoring program may monitor the power an application takes to run. A monitoring program may repeat this process over time such that an embodiment may determine a change in the system power consumption metric over time, as illustrated at 302. By way of example, an application's power consumption may increase over time, e.g., due to a changed setting, the concurrent running of a new application, an over the air update, etc. If no such power consumption metric change is determined, an embodiment may continue to monitor for the same.

An embodiment may also obtain, e.g., from the monitoring program, system change data at 303. For example, a monitoring program may record any changes that were made (by the user or otherwise, e.g., via automatic update) to the application for which power consumption has been recorded. An example of system change data is data indicating that an application setting has been switched, along with a time-stamp. This system change data may be time-stamped or otherwise have timing information associated therewith.

Having system power consumption metrics, system change data, and an indication that system power consumption has changed over time (e.g., increased in that the application is taking more energy to operate), an embodiment may associate the change in the system power consumption metric and the system change data, as illustrated at 304. By way of example, an embodiment may correlate or associate the system change of an application setting change with an increase in system power consumption, in this example an application taking more power to operate.

Having made such an association, an embodiment may thereafter indicate, e.g., to the user using an output device, a system change associated with the change in the system power consumption metric, as illustrated at 305. By way of example, a message may be displayed or otherwise communicated to the user indicating that the system power consumption has increased for a particular application and that a particular setting is associated with that change, e.g., associated in time. This apprises the user of the suspected cause of the increase in power consumption and provides the user with guidance as to how to resolve the issue.

An embodiment may offer a recommendation to improve the change in system power consumption. For example, an embodiment may indicate a different setting that resolves the power consumption issue in question. By way of example, an application that is taking more power to operate may have a setting that has been switched to a sub-optimal value, and an embodiment may thus recommend to the user that the setting should be switched back or adjusted for the application. An embodiment may provide in the indication a link or executable element that leads the user to the appropriate settings menu to implement the recommended change. Furthermore, an embodiment may automatically implement a system change to improve the change in system power consumption, e.g., automatically change the application's setting or do so after user confirmation of the same.

As has been described herein, the monitoring program may be resident on the user's device; however, this is not a requirement. For example, the monitoring program may be distributed across more than one device. Furthermore, the monitoring program's data may be stored in a variety of locations, e.g., the system change data may be derived from a remote device. This allows, for example, pooling of system power consumption data and/or system change data, e.g., the system change data may relate to a plurality of like platforms. A platform may be alike if the software is similar, the hardware is similar, or the system is similar. As may be appreciated, if relevant data is available from other systems, an embodiment may indicate to or warn the user of a potential impact of making a system change, i.e., as it relates to power consumption. Thus, the indication of the association between a system change and system power consumption may occur prior to the determining of a system power consumption change for a particular device.

The various embodiments described herein thus represent a technical improvement to the management of system power consumption. By way of specific example, an embodiment implements a new monitoring capability that in turn generates new and useful data that may be leveraged not only to highlight potential system changes that impact system power consumption, but moreover to make specific and tailored recommendations regarding the resolution or avoidance of the same.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:

identifying, over a time period, using a processor, a change in a system power consumption metric indicating a value of power consumed by a system, wherein the system corresponds to at least one of: a single information handling device and a sub-system of the single information handling device, wherein the identifying a change comprises monitoring an application of the single information handling device while the application is running over the time period and determining that the system performing an operation within the application has a higher power usage at an end of the time period, and after a change to the system has occurred, as compared to a prior power usage of the system performing the operation at a beginning of the time period;

obtaining, using a processor, system change data identifying a plurality of changes to the system that have occurred since the beginning of the time period corresponding to the prior power usage of the system;

associating, using a processor, the change in the system power consumption metric and the system change data, wherein the associating comprises identifying one of the plurality of changes to the system resulting in the change in the system power consumption metric;

indicating, using an output device, a system change associated with the change in the system power consumption metric and a recommendation for improving the system power consumption, wherein the recommendation is based upon identifying a modification to be made to the system to improve the system change and that is related to the identified one of the plurality of changes that resulted in the change; and implementing the recommendation to improve the change in system power consumption.

2. The method of claim 1, wherein the implemented change to the system is associated with the system change data.

3. The method of claim 1, wherein the identifying is performed by a monitoring program distributed across more than one device.

4. The method of claim 1, wherein the system change data is derived from a remote device.

5. The method of claim 1, wherein the system change data relates to a plurality of like platforms.

6. The method of claim 5, wherein the indicating occurs prior to the determining for a particular device.

7. The method of claim 1, wherein the system power consumption metric is selected from the group consisting of operating system (OS) power consumption, application power consumption, and hardware power consumption.

8. The method of claim 1, wherein the associating comprises associating a pattern of power consumption metrics with a plurality of applications.

9. A device, comprising:
a processor;
a memory device that stores instructions executable by the processor to:
identify, over time, a change in a system power consumption metric indicating a value of power consumed by a system, wherein the system corresponds to at least one of a single information handling device and a sub-system of the single information handling device, wherein the identifying a change comprises monitoring an application of the single information handling device while the application is running over the time period and determining that the system performing an operation within the application has a higher power usage at an end of the time period, and after a change to the system has occurred, as compared to a prior power usage of the system performing the operation at a beginning of the time period;
obtain system change data identifying a plurality of changes to the system that have occurred since the beginning of the time period corresponding to the prior power usage of the system;
associate the change in the system power consumption metric and the system change data, wherein the instructions executable by the processor to associate comprise instructions executable by the processor to identify one of the plurality of changes to the system resulting in the change in the system power consumption metric;
indicate a system change associated with the change in the system power consumption metric and a recommendation for improving the system performance, wherein the recommendation is based upon identifying a modification to be made to the system to improve the system change and that is related to the identified one of the plurality of changes that resulted in the change; and implement the recommendation to improve the change in system power consumption.

10. The device of claim 9, wherein the implemented change to the system is associated with the system change data.

11. The device of claim 9, wherein the system power consumption metric is obtained using a monitoring program distributed across more than one device.

12. The device of claim 9, wherein the system change data is derived from a remote device.

13. The device of claim 9, wherein the system change data relates to a plurality of like platforms.

14. The device of claim 13, wherein a system change is indicated prior to determining a change in system power consumption for the device.

15. The device of claim 9, wherein the system power consumption metric is selected from the group consisting of operating system (OS) power consumption, application power consumption, and hardware power consumption.

16. A product, comprising:
a storage device having code stored therewith, the code being executable by a processor and comprising:
code that identifies, over time, a change in a system power consumption metric indicating a value of power consumed by a system, wherein the system corresponds to at least one of a single information handling device and a sub-system of the single information handling device, wherein the identifying a change comprises monitoring an application of the single information handling device while the application is running over the time period and determining that the system performing an operation within the application has a higher power usage at an end of the time period, and after a change to the system has occurred, as compared to a prior power usage of the system performing the operation at a beginning of the time period;
code that obtains system change data identifying a plurality of changes to the system that have occurred since the beginning of the time period corresponding to the prior power usage of the system;
code that associates the change in the system power consumption metric and the system change data, wherein the code that associates comprises code that identifies one of the plurality of changes to the system resulting in the change in the system power consumption metric;
code that indicates a system change associated with the change in the system power consumption metric and a recommendation for improving the system performance, wherein the recommendation is based upon identifying a modification to be made to the system to improve the system change and that is related to the identified one of the plurality of changes that resulted in the change; and code that implements the recommendation to improve the change in system power consumption.

* * * * *